United States Patent [19]

Crivelli

[11] Patent Number: 5,258,222
[45] Date of Patent: Nov. 2, 1993

[54] INCORPORATION OF RUBBER TIRE CRUMBS AND SILICEOUS CRYSTALLINE GRAINS IN CONSTRUCTION PRODUCTS

[76] Inventor: Henry A. Crivelli, 26 Mayflower Rd., W. Yarmouth, Mass. 02673

[21] Appl. No.: 631,893

[22] Filed: Dec. 21, 1990

[51] Int. Cl.⁵ .................. B32B 5/16; B32B 27/38; B32B 25/04
[52] U.S. Cl. .................. 428/323; 428/324; 428/325; 428/327; 428/331; 428/413; 428/492
[58] Field of Search ............ 428/324, 325, 327, 331, 428/413, 492, 323

[56] References Cited

U.S. PATENT DOCUMENTS

| | | | |
|---|---|---|---|
| T931,006 | 4/1973 | Laman | 428/465 |
| 3,030,223 | 4/1962 | Alstad et al. | 428/327 |
| 3,031,325 | 4/1962 | Roberts | 428/327 |
| 3,158,528 | 1/1964 | Brown et al. | 428/324 |
| 3,272,098 | 7/1962 | Buchholtz et al. | 428/327 |
| 4,623,586 | 11/1986 | Umeya et al. | 428/324 |

OTHER PUBLICATIONS

Product Sheet of Baker Rubber Inc., South Bend, Indiana Granulite, Ground Rubber.
Product Sheets of Formulated Resins, Inc. Formulated Resins AR 1001-4 Adhesive Series.
Product Sheet of Tacc International Corp., Rockland, Mass. SBR Elastomer Emulsion.
Product Sheet of Tacc International Corp., Rockland, Mass. XTW 14121 water based, contact adhesive.
Product Sheet of TACC International Corp., Rockland, Mass. Toxic Chemicals.
Product Sheet of TACC International Corp., Rockland, Mass. Epoxy Resin Curing Agent.
Product Sheet of TACC International Corp., Rockland, Mass. Neoprene Elastomer Emulsion.
Product Sheet of TACC International Corp., Rockland, Mass. Epoxy Resin.
Product Sheet of TACC International Corp., Rockland, Mass. Speed Set 2000 water based contact adhesive.
D. A. Hills, "Heat Transfer and Vulcanization of Rubber, Eljevier Publishing" (1971).
Product Sheet of TACC International Corp., Rockland, Mass. Nonflammable Solventborne Adhesive.
Product Sheet of TACC International Corp., Rockland, Mass. N-162, Non-flammable chlorinated solvent cement.
Product Sheet of Frekote Products, Seabrook, New Hampshire Frekote 810 Release Interface for Molding Rubbers.
The Dexter Corporation, Seabrook, New Hampshire FK8120-Aerosol.
Morton, M., Rubber Technology, Van Nostrand Reinhold, (1987) pp. 59-61, 191-219.

Primary Examiner—Paul J. Thibodeau
Assistant Examiner—Leszek Kiliman
Attorney, Agent, or Firm—Morse, Altman, Dacey & Benson

[57] ABSTRACT

A rubber tire recycling process comprises the steps of granulating rubber tires to form coarse rubber crumbs, mixing the coarse rubber crumbs with coarse siliceous grains to form a closely packed mixture of coarse particles that are roughly commensurate in size, thoroughly wetting the surfaces of the coarse particles with a polymerizable liquid binder to provide a viscous slurry, casting the slurry into a sheet-like configuration, and curing the sheet-like configuration under sufficient heat and for a sufficient time to provide an environmentally compatible sheet-like product, e.g. a paver or tile for driveways, or a shingle for roof tops, that is characterized by excellent weather, wear and chemical resistance. The surface characteristics of the coarse particles of vulcanized rubber and crystalline grains are critical to the present invention.

4 Claims, 3 Drawing Sheets

INCORPORATION OF RUBBER TIRE CRUMBS AND SILICEOUS CRYSTALLINE GRAINS IN CONSTRUCTION PRODUCTS

BACKGROUND OF THE INVENTION

1. Field of the Invention

The present invention relates to products having compositions incorporating rubber crumbs derived by recycling rubber tires and, more particularly, to the manufacture of slabs of construction material containing recycled tire rubber, and products thereof.

2. The Prior Art

An ongoing critical need exists for an environmentally compatible construction material that is wear, weather and chemical resistant. The present invention contemplates the use, as a substantial ingredient in such construction material, of vulcanized rubber crumbs derived from the ever increasing supply of scrap rubber tires. The present invention is environmentally compatible in the sense that it utilizes a growing accumulation of scrap that is very difficult to discard.

The problem of scrap tires and their disposal has occupied the attention of many for years. Some have suggested using whole scrap tires for erecting structures. See Martin Pawley, *Building for Tomorrow: Putting Waste to Work*, Sierra Club Books, San Francisco, 1982.

Others have developed machines designed to cut the tread portion from the tire for use as a roof covering. Ibid. Still others have turned to incineration for the direct production of energy, or to tire rubber chips as a fuel supplement in paper and pulp mills, cement kilns and other industrial heat generators. For one reason or another, few of these recycling efforts have been adequately successful commercially and environmentally.

Recycled rubber, as defined by the Rubber Recycling Division of the National Association of Recycling Industries, Inc., generally refers to any sort of rubber waste, including scrap tires, that has been converted into an economically useful form, such as reclaimed rubber, ground rubber, reprocessed rubber and die-cut punched rubber parts. Reclaimed rubber, on the other hand, represents a product resulting from a process in which waste vulcanized scrap rubber is treated to produce a plastic-like material that can be easily processed, compounded and re-vulcanized with or without the addition of either natural or synthetic binders. It is, of course, known that the vulcanization process technically, by definition, is irreversible. Nevertheless, an accepted definition for "devulcanization" is a change in vulcanized condition which results in decreased resistance to deformation at ordinary temperatures.

Most techniques for reclaiming scrap rubber involve batch processing. In one continuous technique, the scrap rubber is ground, and any foreign components such as metal and/or fiber are mechanically separated from the ground rubber remainder, which is then further ground to finer particle size. Then the finely ground rubber, together with various reclaiming agents, are metered into a blending system and conveyed to a special screw-extrusion machine. The screw-extrusion machine is jacketed along the screw's axial length to provide for several zones of controlled temperature, employing either hot oil or cooling water. The clearance between the screw and the jacketed chamber wall is close and adjustable. In the screw-extrusion machine, the finely ground rubber is subjected to a controlled and variable amount of high heat and pressure in a continuously moving environment. Softened rubber is then continuously discharged from the extrusion head, whereupon it is cooled and conveyed to the millroom for the final stage of the reclaiming process. For screw extruders, see D. H. Morton-Jones, *Polymer Processing*, Chapman and Hall, 1989.

In the millroom, the softened and now cooled rubber is generally mixed with ingredients in a suitable blender, then rewarmed and replasticated in a barrel-mixer. Thence it is fed first to a high-friction breaker mill and next to a high-friction refiner mill. A high-friction ratio for the refiner mill is achieved with different-sized rolls rotated at considerably different speeds. The rolls are set tightly to obtain a thin sheet of reclaimed rubber that is smooth, uniform and free of grain or lumps. The finished thin sheet of reclaimed rubber emanating from the refiner mill is pulled to a wind-up drum, and allowed to build up to a thickness of about an inch before being cut therefrom by a knife. The resulting reclaimed rubber slab is dusted to reduce tackiness and stacked. Since reclaimed rubber is cheaper than natural or synthetic rubber, it is widely used in the manufacture of new rubber goods, including new tires.

The present invention relates to a novel process of recycling, not reclaiming, scrap tire rubber, and to various recycled rubber products so made, not including tires.

SUMMARY OF THE INVENTION

It is a principal object of the present invention to provide a recycling process for incorporating vulcanized rubber granules, obtained from discarded tires, into rubber matrices and to products so made.

Generally, the process of the present invention comprises the steps of granulating rubber tires to form coarse rubber crumbs, mixing the coarse rubber crumbs with coarse siliceous grains to form a closely packed mixture of coarse particles that are roughly commensurate in size, thoroughly wetting the surfaces of the coarse particles with a polymerizable liquid binder to provide a viscous slurry, casting the slurry into a sheet-like configuration, and curing the sheet-like configuration under sufficient heat and for a sufficient time to provide an environmentally compatible sheet-like product, e.g. a paver or tile for driveways, or a shingle for roof tops, that is characterized by excellent weather, wear and chemical resistance. The surface characteristics of the coarse particles of vulcanized rubber and crystalline grains are critical to the present invention.

More specifically, it is an object of the present invention to provide a process of making recycled rubber products essentially comprising shredding a plurality of scrap tires into chips, grinding the chips into coarse granules, removing therefrom impurities to form crumb rubber, mixing the crumb rubber and coarse granules of a siliceous filler such as silica with a compatible polymerizable binder, forming thereby a fluid dispersion having solid internal phase and viscous external phase, with the latter wetting the former, and heating the fluid dispersion so as to solidify the external phase to provide slabs and panels suitable for paving and construction. A generous proportion of silica has been found to enhance such properties as hardness, dimensional durability, and wear resistance.

Preferably, the starting external phase is characterized by a thermoplastic rubber emulsion, e.g. neoprene, or a liquid epoxy and a catalyst. The crumb rubber is essentially derived from a random sampling of copolymer rubber tires, and preferably from the treads of such tires, which are fromulated for wear resistance. These include thermoplastic rubber incorporating block copolymers composed of hard and soft segments, physically crosslinked to one another and exhibiting crystalline behavior on stretching. Preferably, both the crumb rubber and the siliceous filler have a mesh size ranging from about 5 to 50. Preferably, the external phase is composed of a polymer which is physico-chemically compatible with the crumb rubber, whereby the interface between the phases is characterized by molecular wetting initially and cross-linking on curing. The microstructure is such that the siliceous filler is tightly locked into place mechanically as well as adhesively.

Other objects of the present invention will in part be obvious and will in part appear hereinafter.

The invention accordingly comprises the process and the resultant products of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION

Figure 1:
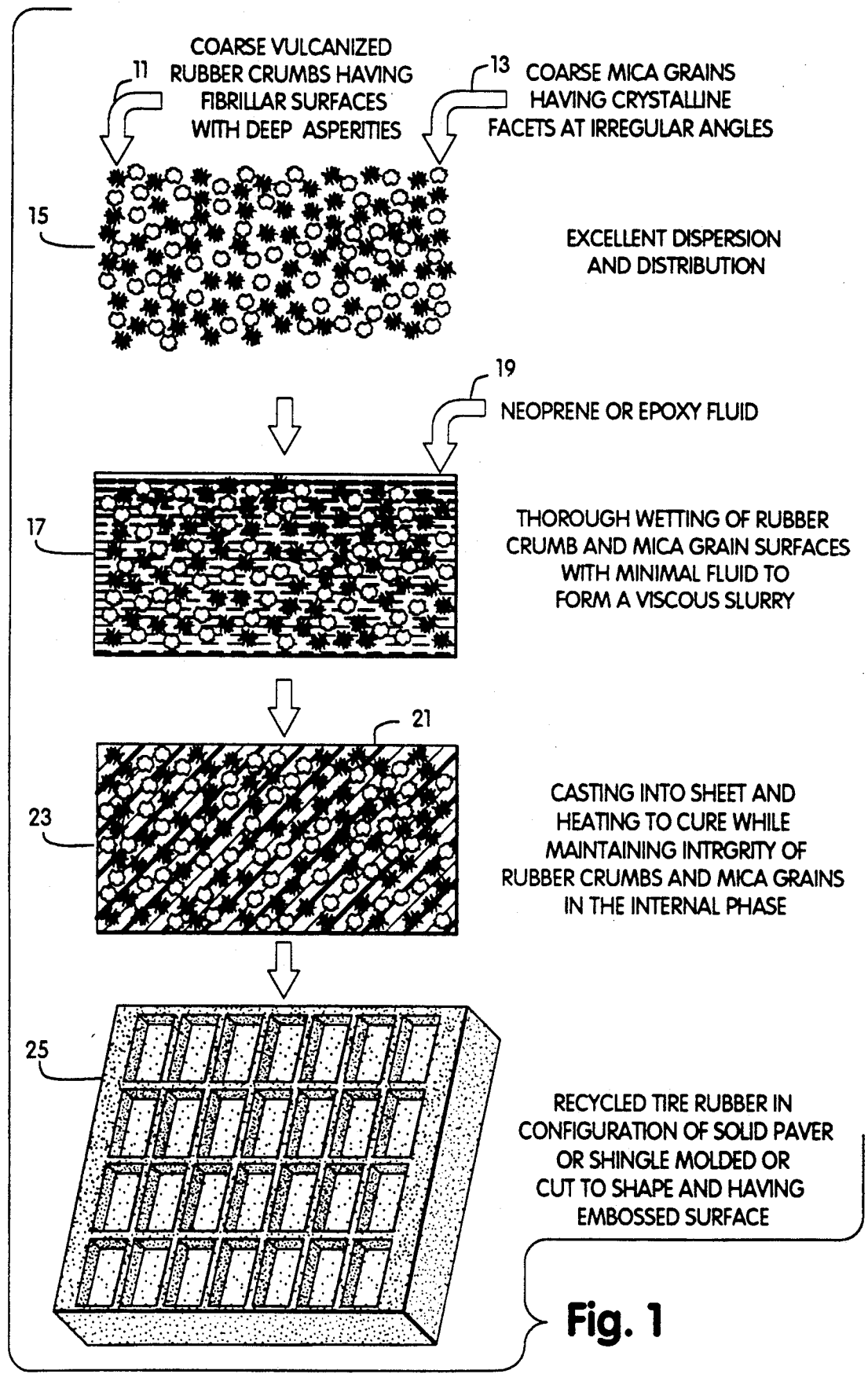
FIG. 1 is a general flow diagram of a process and the resulting product of the present invention, showing the steps of the process and suggesting characteristics of the particles in exaggerated cross-section, and the configuration of an end product.

The Process and Product as Depicted In FIG. 1

The process of the present invention is illustrated generally in a flow diagram FIG. 1 which shows the steps of a recycling process in which vulcanized rubber derived from discarded tires, and crystalline silica granules of roughly commensurate size, i.e. generally no greater than an order of magnitude in difference, are incorporated into a polymeric matrix, and by which final products are obtained.

The first step in this process is to cut scrap tires, preferably the treads only, into flakes and to mill the flakes into coarse vulcanized rubber "crumbs", as shown at 11 in FIG. 1. It has been found that rubber crumbs produced by typical milling procedures, and as shown in FIG. 1, are characterized by fibrillar surfaces with deep asperities, i.e. fragmented surfaces which, under the microscope, have varying areas of deep asperities or valleys, and erratic fibrils or filaments. The coarse mica grains, as shown at 13, are typical of siliceous crystals having planar facets at irregular angles. The rubber crumbs and mica grains are roughly commensurate in size, preferably being no more than an order of magnitude different diametrically. Preferably the rubber crumbs and silica grains both generally are in the average range of 5-50 mesh. In the dry mixture shown at 15, the dispersion and distribution of the rubber crumbs and crystalline grains are excellent, i.e. the mixture is not characterized by clumps of either rubber crumbs or crystalline grains.

Next, the dry mixture of rubber crumbs and crystalline grains is thoroughly wetted as at 17 by a quantity of polymerizable liquid 19, preferably an aqueous dispersion of an elastomeric diene such as a neoprene, or an epoxide monomer such as epoxy and an epoxide catalyst such as an epoxy catalyst. The quantity of polymerizable liquid preferably is limited to slightly more than the approximate minimum, which, at its particular viscosity, is necessary to thoroughly wet the fibrillar surfaces and deep asperities of the rubber crumbs and the irregular crystalline facets of the mica grains. The resulting viscous slurry is cast into sheet form as at 21. The casting in one form is effected in a succession of open top molds (not shown) which permit the slurry's top surface to be smoothed by paddling to form slabs. The casting in another form is effected from a hopper for extrusion between rollers into sheets from which slabs are cut. At this point in some cases, at least one of the surfaces of the slab is embossed to provide a decorative texture.

Typically, where the liquid phase is a aqueous diene dispersion such as neoprene, in parts by total weight, the rubber crumbs are in the 20-40 range, the silica granules are in the 5-15 range, the diene is in the 10-30 range, and optional coloring is in the 0-5 range. Typically, where the liquid phase is an epoxy and epoxy catalyst, in parts by total weight, the rubber crumbs are in the 20-40 range, the siliceous granules are in the 5-15 range, the epoxy and catalyst together are in the 10-30 range, the epoxy being in the 10-20 range, and the epoxy catalyst being in the 5-10 range, and optional coloring being in the 0-5 range. Preferably, the composition consists, by weight, of a greater proportion of rubber crumbs than siliceous granules. The relative proportions of the components of the composition of the intermediate slurry and of the final product are approximately the same. Preferably the thickness of the cast slurry as well as the thickness of the final slab product ranges from 3/16 to ⅜ inch.

Curing as at 23 of the neoprene slurry preferably is effected at a temperature of 100-150 degrees F. for a period of 0.25-3 hours. Curing of the epoxy slurry typically is effected at room temperature for a period of 0.25-3 hours. In the final solid composite product, as shown at 23, both the vulcanized rubber crumbs and the crystalline silica granules substantially maintain the integrity of their original configurations. The polymerizate, however, is so completely intimate with the surfaces of the vulcanized rubber crumbs and crystalline silica granules that they are macro-mechanically, as well as chemically bonded, there being cross-linking between the polymerizate and the rubber crumb surfaces, and mechanical locking as well as adhesion between the polymerizate and the crystalline facets.

The presence of silica increases the hardness of the final product by reducing inherent elasticity. Silica ($SO_2$) is naturally occurring silicon dioxide. It occurs in crystalline and also in amorphous forms, as well as combined in silicates. A silicate is a large group of minerals whose crystal lattice contains $SiO_4$ tetrahedra, either isolated or joined through one or more of the oxygen atoms. By controlling the amount of the silica added to the binder, the hardness of the recycled rubber product can be controlled even though the quantity of binder needed is reduced.

Composition of Rubber Tires Recycled Hereunder

As known, two of the most critical properties of rubber and rubber compounds include processibility and vulcanization. Processability includes the conversion of elastic raw material into pliable "green stock," incorporation therein of required additives, referred to as "compounding," followed by "milling," including calendering or tubing. After processing, the stock must be cured or, as better known, vulcanized. "Vulcanization" is a process involving the chemical bonding, i.e., the chemical crosslinking, of the rubber chains, usually with the aid of a vulcanizing agent, such as sulfur, and an accelerator under high pressure and at elevated temperature. During the process of vulcanization, the green stock changes from a plastic state to an elastic state. Consequently, with the elimination of plasticity, the vulcanized rubber's inherent resistance to deformation increases, as does its strength, resilience, and toughness. Vulcanization also eliminates thermoplasticity, i.e., the material's ability repeatedly to soften when heated and harden when cooled. Vulcanization further introduces insolubility to the vulcanized rubber in solvents in which the green stock rubber was previously soluble.

The "rate of cure" of the green stock refers to the rate at which modulus develops after the scorch point. Scorch is the result of the combined effects of time and temperature, i.e. the heat history, on an already compounded stock. "Scorch time" generally defines the time to onset of vulcanization and represents the time available for processing. "Cure time" is that time which is required for the desired amount of crosslinking to occur in the stock so as to produce the desired level of properties in the final product. Cure time is a function of "scorch time" and the "crosslink time," which latter is controlled by the rate of cure. Depending on the end use, some rubber products are more vulcanized, i.e., crosslinked, than others. Specifically, tires are more highly vulcanized than many other rubber products. And even among as well as within tires, various parts are more highly vulcanized than others.

In general, "state of cure" refers to the level of vulcanization of the stock re its ultimate value when fully vulcanized. As crosslinking proceeds, the modulus of the compounded stock increases, indicating progressively higher states of cure. The optimum state of cure refers to that amount of crosslinking which results in the maximum modulus. All of the properties of the final rubber product imparted thereto by vulcanization do not reach their respective optimum values at the same level of cure, however.

As is well known, there are essentially two kinds of rubbers: thermosetting and thermoplastic. Thermosetting rubbers, once vulcanized, cannot be plasticized, whereas thermoplastic rubbers can be. Throughout the process of the present invention and in the final products the rubber crumbs of the internal phase remain thermosetting.

Natural rubber is a polyisoprene, featuring excellent resilience and low hysteresis. "Hysteresis" is a measure of the energy absorbed when the rubber is deformed. In a tensile test, i.e. a stress and strain test diagram, it represents the loop enclosing an extension curve (stretching) and the return curve as the extension is reversed (relaxing). The absorbed energy is equivalent to the reciprocal of the resilience. Consequently, low hysteresis rubbers are used in applications where low energy absorption is important, such as in the walls of tires where low energy absorption prevents heat build up as the tire walls flex. Conversely, high hysteresis rubbers are used for tire treads where the low resilience and energy absorbing properties reduce bouncing and thus help grip the road. Processes now exist for the manufacture of "synthetic natural rubber" by the controlled polymerization of isoprene monomer. The rubber crumbs of the present invention ordinarily contain tire tread rubber, i.e. relatively high hysteresis rubber, as their characteristic ingredient.

Styrene butadiene rubber (SBR) is a relatively high hysteresis rubber which finds a great deal of application in tire treads. SBR is a random copolymer of styrene and butadiene. The relative proportions of styrene and butadiene vary, depending on final product application. The higher the proportion of styrene, the tougher is the resultant SBR. A general purpose SBR is about 23% styrene and about 77% butadiene. The higher proportions of styrene are used in special reinforcing grades used in mixtures to improve toughness and abrasion resistance. These special grades can have 50% or even higher proportions of styrene, making these grades of SBR very hard and more resinous. The ranges of styrene vs. butadiene can vary from about 20% to about 55% styrene and to about 80% to about 45% of butadiene. SBR is a diene rubber, with its monomers possessing two double bonds. Upon their polymerization, diene rubbers leave an unsaturated double bond present in the polymer molecule. Chloroprene rubber (CR) is another diene rubber in which, however, a chlorine atom substitutes for the hydrogen atom in butadiene. CR is a crystalline rubber, that is, it exhibits crystalline stress-strain properties when stretched.

The vulcanized tire tread rubber of the present invention typically, by total weight, consists essentially of: from 8–25% of an organic solvent residue such as acetone; from 5–10% of an inorganic residue such as ash; from 25–45% of an inorganic filler such as carbon black; from a trace to 2% moisture; and from 35 to 50% crosslinked rubber hydrocarbon.

Figure 2:
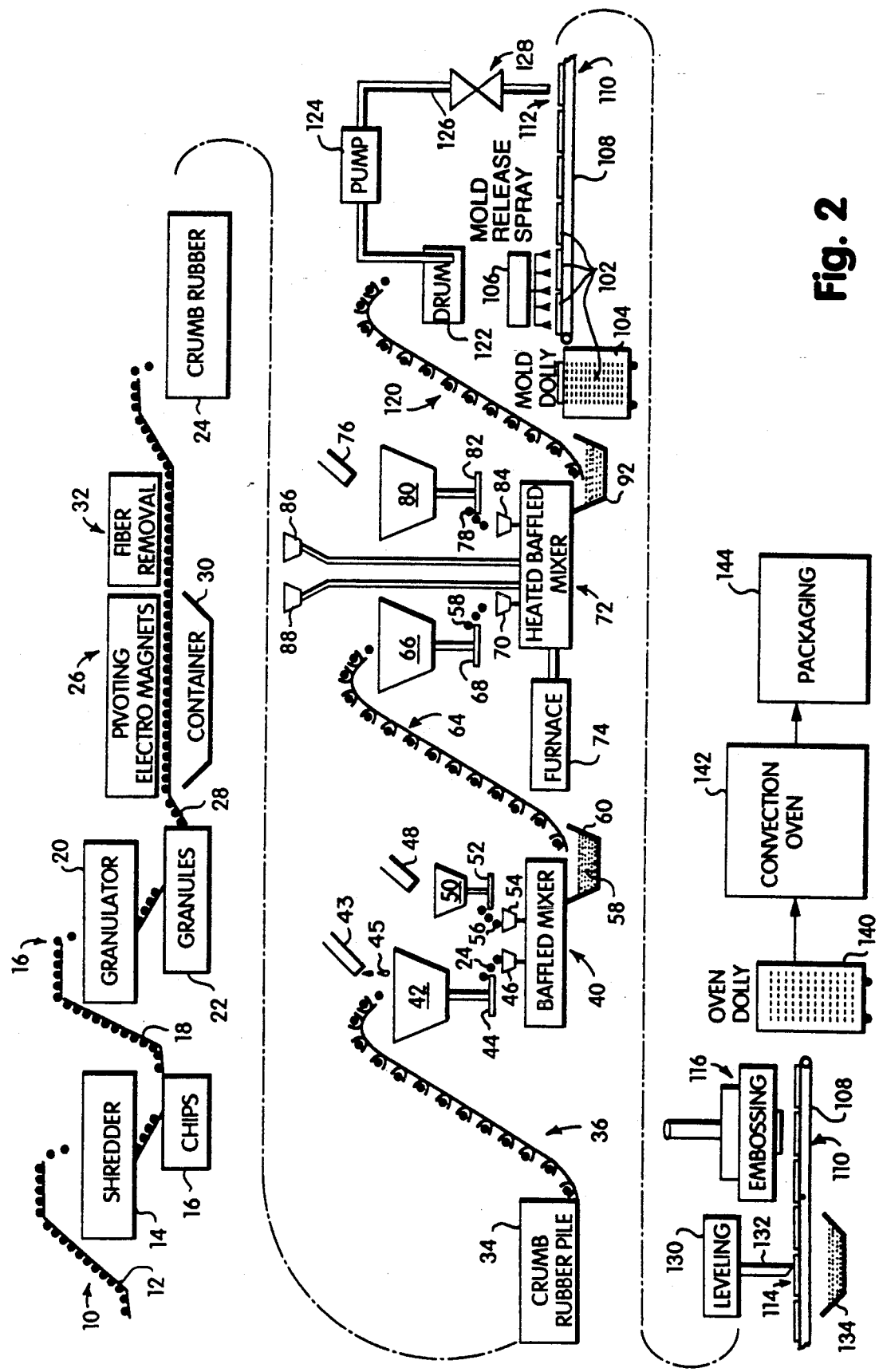
FIG. 2 is a schematic diagram of a process of the invention.

The Detailed Process Steps of FIG. 2

FIG. 2 is a schematic diagram illustrating detailed steps of a preferred process of the present invention. The process begins by feeding a plurality of scrap tires 10, preferably the treads only, via a belt conveyor 12 to a tire shredder 14, which shreds the tires into chips 16 of about 1×2 inch size. The chips 16 are fed via a second belt conveyor 18 into a granulator 20 where they are divided into granules 22 characterized by a mesh size generally in the range of 5 to 50, depending on the requirements of the particular end product intended. If needed, the granules 22 can be refed to the granulator 20 for a second run to achieve a finer mesh. Alternatively, a pair of granulators 20 can be operated in tandem whenever the production calls for a finer mesh.

The next step involves removal of impurities, such as metal particles and fibers, leaving crumb rubber 24. The removal of steel particles is accomplished by pair of pivotable electro-magnets 26. Each of the electromagnets 26 is pivotably mounted via a pivot arm (not shown) and located above a third belt conveyor 28. The pivot arm has two operative positions: a pick-up position, at which the arm locates the magnet over conveyor belt 28 and, a drop-off position, at which the arm swings at least 90° away from belt 28 toward a suitable container 30. In the pick-up position, the magnets are energized to attract and separate metal components from rubber granules 22. In the drop-off position, the magnets are de-energized to allow the metal components to fall into container 30, which is located alongside conveyor belt 28. A pair of such pivotable electromagnets, preferably operated sequentially and mounted in tandem, effectively remove substantially all of the metal components from the rubber crumbs. The removal of the impurities can be optimized by adjusting the speed of belt conveyor 28 and by adjusting the strength of the magnetic flux of the electro-magnets. Adjacent the pivoting electro-magnets 26 is located a fiber removal station 32. Fiber removal station 32 can be any known device, including one that employs screening to separate relatively extensive fibers from among the relatively condensed crumb rubber 22. With the impurities removed from crumb rubber 22, a supply of clean crumb rubber 24 is produced. Crumb rubber 24 ordinarily is bagged for packaging and shipment to a further processing facility according to the invention.

Next crumb rubber 24 fed from a supply 34 via a cup-conveyor 36 to a baffled mixer 40. More specifically, crumb rubber 24 via conveyor 36 and silica 45 through a funnel 43 are fed to a funnel 42. A scale 44, mounted under funnel 42, meters the selected ratio by total weight of crumb rubber 24 and silica 45 via a funnel 46 into baffled mixer 40. An appropriate binder 56 is sequentially added from an overhead nozzle 48 into a further funnel 50, whence it also is metered in the selected amount by total weight, with the aid of a second scale 52 and a further funnel 54, into baffled mixer 40.

The metered mixing of crumb rubber 24 and silica 45 with compatible binder 56 in the baffled mixer 40 produces a fluid dispersion 58 which is collected in a suitable trough 60. The fluid dispersion 58 has an internal phase consisting essentially of vulcanized crumb rubber 24 and silica 45, and an external phase consisting essentially of binder 56 for wetting and carrying the internal phase. The fluid dispersion 58 next is heated as in a heated mixer 72 for about 5 to 15 minutes and at a temperature from about 110° to about 175° F. so as to solidify the external phase of dispersion 58.

The fluid dispersion 58 is continuously removed from trough 60 by a second cup conveyor 64 to advance it to a funnel 66, whence it is metered by weight, via a scale 68, into a further funnel 70 of a heated baffled mixer 72, where the heating step is effected. The mixer 72 is preferably heated by a hot air furnace 74 operatively connected thereto. Preferably and, depending upon the end use of the final product, the mixer 72 is heated to a temperature from about 100° F. to about 150° F. and, for most applications preferably about 125° F.

Depending on the final product, a further amount of crumb rubber 78 is added by weight to the mix of crumb rubber 24 and silica 45 in the mixer 72 via a funnel 80, a scale 82 and a second funnel 84. In one form, a clear binder is added by weight to the mixture in the mixer 72 via a funnel 86, depending on end use.

Figure 3:
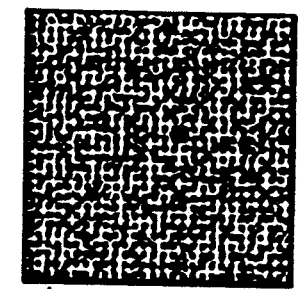
FIGS. 3, 4, 5 and 6 show the configurations of various end products.
Figure 4:
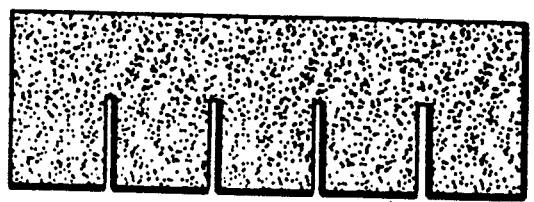
Figure 5:
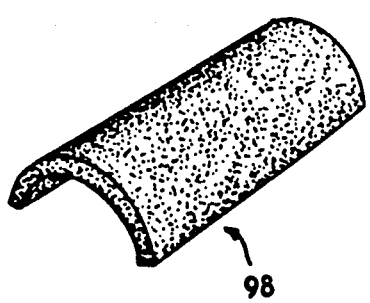
Figure 6:
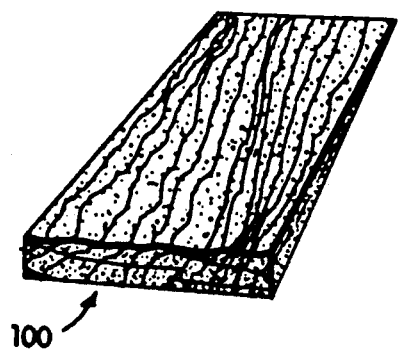

If the final product is to be a semi-rigid paver 94 as illustrated in FIG. 3, or a roof tile 96 as illustrated in FIG. 4, or a Spanish shingle 98 as illustrated in FIG. 5, or a shake 100 as illustrated in FIG. 6, further processing steps are appropriate. These steps include casting of the treated crumb rubber mixture in a suitable mold, baking and air drying the mixture so as to harden and cure the same into a rectangular, curved or tapered style.

In one process of the invention, open-top molds 102 are loaded into a movable mold dolly 104 such that when the top mold 102 is removed, the next succeeding one automatically moves up to take its place. The molds 102 preferably are rubber-compatible, i.e, not adherent to the matrices being produced, facilitating their removal from the molds. Toward this end the molds, in one form, are composed of polyurethane. In another form, the molds 102 first are sprayed, as at 106, with a mold release material, such as a liquid including at least a member of the class consisting of dichlorodifluoromethane, aliphatic petroleum naphthas, and trichlorotrifluoroethane.

As shown, the molds 102, when positioned on a conveyor belt 108, are carried first under the mold release spray 106 and then onto a molding machine 110. If the molds 102 are made of polyurethane, the mold spraying station 106 is omitted from the set-up in the manufacturing sequence. The molding machine 110 preferably includes a mold filling station 112, a leveling station 114, and an embossing station 116.

The treated rubber crumb mixture emanating from the heated baffled mixer 72 and accumulating in the trough 92, is continuously removed therefrom by a third cup conveyor 120. Cup conveyor 120 in turn carries the treated crumb rubber to and into an agitating drum 122, whence it is advanced via a pump 124 and a tube 126 to a valved outlet 128 located at the mold filling station 112 of the molding machine 110. At the mold filling station 112, the individual open-top molds 102 are filled seriatim as each arrives under the valved outlet 128. When filling larger molds 102, it may be advantageous or desirable to operate the conveyor belt 108 intermittently so as to have a dwell time under the outlet 126 sufficient to fill the mold 102.

As the filled mold 102 is carried along by the conveyor belt 108, its contents, i.e. the treated rubber crumb, preferably is levelled off by a leveling machine 130, more specifically a leveling arm 132. The leveling arm 132 preferably is mounted at an angle to the direction of motion of the conveyor belt 108 so as to assure that the excess being scraped off the filled molds 102 is carried off the side of the molds and off the conveyor belt 108, with the excess being collected in a receptacle 134 disposed adjacent and below the belt 108. The leveling arm 132 may be stationary, but preferably is but one of a plurality of rotating blades or paddles. In one form of this process, the smoothed down top surface of the mixture in the molds 102 is embossed with a pattern at the embossing station 116. Such pattern embossing is particularly desirable when manufacturing rubber pavers 94, as illustrated in FIG. 1, for use on cement walkways or driveways, especially when the rubber pavers 94 are colored.

The filled molds 102 leaving the embossing station 116 of the molding machine 110 are stacked in a movable oven dolly 140. Preferably, the oven dolly 140 is constructed with a plurality of perforated horizontal supports spaced vertically to allow for both the size of the filled molds 102 and the efficient movement of hot air therebetween in a convection oven 142 into which one or more of the filled oven dollies 140 are moved. Preferably, the crumb rubber mixture in the molds 102 is baked within the convection oven 142 at a temperature from about 100° F. to about 150° F., and preferably at about 125° F., for at least about one hour to about three hours. The oven dolly 140 or dollies, with the now baked mixture in the molds 102, is then removed from the convection oven 142 and allowed to be dried in ambient air to further harden and cure the crumb rubber mixture in the molds 102.

The hardened and cured sheet material, which may be any one of the final products 94, 96, 98 or 100, is then stripped from the mold 102, stacked and packaged at a convenient packaging station 144 and made ready for shipment.

The following non-limiting examples further illustrate the present invention.

EXAMPLE I

A paver of the type shown at 25 in FIG. 1 was produced as follows. 28 ounces of crumb rubber particles and 10 ounces of silica particles were thoroughly mixed to form a closely packed powder. Under the microscope, the crumb rubber particles had shredded surfaces with extending fibriles and deep asperities. Under the microscope, the mica particles had typical crystalline facets at irregular angles. The composition and mesh of the crumb rubber particles were as follows:

TABLE 1

PRODUCT DESCRIPTION:

Ground rubber, produced from truck and passenger tread rubber, free of foreign material, fabric, and steel, in particle sizes per the sieve analysis below.

TABLE 2

| PRODUCT ANALYSIS: | Minimum | MAXIMUM | TEST METHOD |
|---|---|---|---|
| Acetone Extract | 10.0% | 22.0% | BTM-4-07 |
| Ash Content |  | 7.0% | BTM-4-05 |
| Carbon Black Content | 29.0% | 39.0% | BTM-4-10 |
| Moisture Content |  | 1.0% | BTM-4-04 |
| Rubber Hydrocarbon | 42.0% |  |  |
| Bulk Density |  | 100/21000 | BTM-4-02 |

TABLE 3

SIEVE ANALYSIS - % Retained (Wt.)       BTM-5-01

| | 8 .0937 | 10 .0787 | 16 .0469 | 20 .0331 | 30 .0234 | 35 .0197 | 40 .0165 | 50 .0117 |
|---|---|---|---|---|---|---|---|---|
| TR-10 | 0 max | 3 max |  | 25 min |  |  |  |  |
| TR-16 |  | 0 max | 3 max | 15–45 min |  |  |  |  |
| TR-20 |  |  | 0 max | 5 max | 25 min |  |  |  |
| TR-30 |  |  |  | 0 max | 5 max |  | 25 min |  |
| TR-35 |  |  |  | 0 max | .1 max | 5 max |  | 25 min |
| TR-40 |  |  |  | 0 max | .1 max |  | 10 max | 25 min |

The composition of the mica was crystalline $SiO_2$ and the mesh size average was about 45. The mixture was thoroughly wetted by 15 ounces of a neoprene elastomer emulsion sold by TACC International Corp., Rockland, Massachusetts, under the trade designation CA-544, Speed Set 2000. This aqueous emulsion contained 50% rubber solids, weighed 9.1 pounds per gallon, had the viscosity of light syrup and had a dry time of 10–13 minutes. When thoroughly mixed, the resulting slurry was cast into an open top mold and the upper surface was first paddled smooth and then configured by an embossing tool. The mold, previously had been treated with a release agent containing dichlorodifluormethane and aliphatic petroleum naphtha sold by 810. The composite mixture was heated in the mold for 1 hour at 125° F. The resulting product, which was well adapted for use as a paver, was generally rectangular in shape and about ⅜ths of an inch thick. Several of these pavers when bonded to a driveway by epoxy and an epoxy catylist showed excellent wear, chemical, and weather resistance over a period of several months. In this example, the crumb rubber was supplied by Baker Rubber, Inc. under the trade designation GRANULITE and was specified as having been produced from truck and passenger tread tire (which have different modulies and hysteresis characteristics) free of foreign material, fabric and steel.

The mica was commercially available. The driveway paved as above first was cleaned of dust, dirt and foreign matter. Non-porous surfaces were roughened and wiped free of dust and dirt. These were then cemented in place by a water-based, contact adhesive, applied to both the under side of the pavers and the surface being paved. One such contact adhesive was composed of the same neoprene as was used as a binder in the manufacture of the paver itself.

EXAMPLE II

A roof shingle embodying the present invention was produced as follows. 30 ounces of crumb rubber particles, of the type used in Example I and 10 ounces of silica particles having an average size of approximately 40 mesh were throughly mixed to form a closely packed powder. Under the microscope the crumb rubber particles could be seen as having ragged surfaces with extending fibriles and deep asperities. Under the microscope the mica particles had typical crystalline facets at irregular angles. A neoprene formulation in the amount of 12 ounces, together with color pigment in the amount of 2 ounces, were added and thoroughly mixed into the dry powder. The neoprene was a typical commercial formulation consisting essentially of approximately 50% polymerizable rubber and a remainder of aqueous vehicle. The resulting slurry was poured into a polymethane mold. The surfaces of the slurry was paddled until smooth and the mold heated at a temperature of 125° F. for a period of one hour. The resulting slab, which was well adapted for use as a roof tile, was generally rectangular in shape and about ⅜ths inch thick. This roof tile, which was subjected to abrasion, chemical solvents including gasoline, and weather, demonstrated excellent wear, weather and chemical resistance.

EXAMPLE III

The process of example I was repeated except that the ingredients were mixed in the following proportions: rubber crumbs having the composition defined in Example I, 20 ounces; siliceous granules having the composition defined in Example I, 10 ounces; as a substitution for the neoprene, epoxy monomer and epoxy catalyst in 2:1 proportions, 10 ounces; and coloring, .1 ounce. The result of the process was a paver of the type shown in FIG. 1.

EXAMPLE IV

The process of example I was repeated except that the ingredients were mixed in the following proportions: rubber crumbs having the composition defined in Example I, 20 ounces; siliceous granules having the composition defined in Example I, 10 ounces; as a substitution for the neoprene, epoxy monomer and epoxy catalyst in 2:1 proportions, 5 ounces; and titanium dioxide, 10 ounces. The result of the process was a paver of the type shown in FIG. 1 having a pleasing grey color.

EXAMPLE V

The process of example I was repeated except that the ingredients were mixed in the following proportions: rubber crumbs having the composition defined in Example I, 40 ounces; siliceous granules having the composition defined in Example I, 10 ounces; neoprene 30 ounces; and coloring, 1 ounce. The result of the process was a roof tile of the type shown in FIG. 3.

EXAMPLE VI

The process of example I was repeated except that the ingredients were mixed in the following proportions: rubber crumbs having the composition defined in Example I, 40 ounces; siliceous granules having the composition defined in Example I, 10 ounces; as a substitution for the neoprene, epoxy monomer and epoxy catalyst in 2:1 proportions, 5 ounces; and titanium dioxide, 30 ounces. The result of the process was a paver of the type shown in FIG. 1 having a pleasing grey color.

EXAMPLE VII

The process of example I was repeated except that the ingredients were mixed in the following proportions: rubber crumbs having the composition defined in Example I, 40 ounces; siliceous granules having the composition defined in Example I, 10 ounces; as a substitution for the neoprene, epoxy monomer and epoxy catalyst in 2:1 proportions, 25 ounces; and coloring, 1 ounce. The result of the process was a paver of the type shown in FIG. 1.

EXAMPLE VIII

The process of example I was repeated except that the ingredients were mixed in the following proportions: rubber crumbs having the composition defined in Example I, 20 ounces; mica having the composition defined in Example I, 10 ounces; neoprene, 30 ounce; and a fungicide of the type sold by Rhom and Haas under the trade designation SHANE M-8. The result of the process was a roof shingle that resisted fungis, as well as weather and wear.

ALTERNATIVE EMBODIMENTS

In some less preferred processes of the present invention for the production of roofing shingles and the like, the siliceous crystals are omitted entirely. In such a case, Examples of the process of the present invention are similar to Examples I and II above except that the siliceous particles are omitted and the weight of the binder is reduced by approximately ⅓.

OPERATION

In operation, the process of the present invention comprised the following steps. Shredding a supply of rubber tires to produce a supply of rubber pieces. Grinding the rubber pieces to produce a preliminary supply of vulcanized rubber crumbs and metal and fiber impurities. Magnetically removing the metal and removing the fiber from the supply to produce an intermediate supply of vulcanized rubber crumbs. Mixing the intermediate supply of vulcanized rubber crumbs with a supply of mica granules to produce a dry powder. The rubber crumbs and the crystalline granules on average are no more than an order of magnitude different in size. Mixing the dry powder and a binder having as its essential ingredient a member of the class consisting of a polymerizable rubber dispersion and a polymerizable epoxy fluid. Thoroughly wetting the surfaces of the rubber crumbs and the crystalline particles and forming a viscous composite having an internal phase of closely packed rubber crumbs and mica granules and an external phase of a polymerizable member of the class consisting of rubber and epoxy. Curing said viscous composite to form a solid composite having an internal phase including final rubber crumbs and final siliceous crystalline grains. The final rubber crumbs and the final crystalline grains respectively being essentially of the same size and configuration as the intermediate rubber crumbs and the intermediate crystalline grains.

What is claimed is:

1. A product in the form of a configured slab, said product consisting essentially of:
   (a) rubber crumbs composed of tire tread rubber, said rubber crumbs being characterized by fibrillar surfaces with asperities;
   (b) siliceous crystalline granules, said siliceous crystals having planar facets at irregular angles;
   (c) said rubber crumbs and said crystalline granules on average being no more than an order of magnitude different in size;
   (d) a binder in the form of a polymerizate having as its essential ingredient a member of the class consisting of a polymerized rubber and a polymerized epoxy;
   (e) said binder intimately contacting said fibrillar surfaces and said asperities of the surfaces of said rubber crumbs and said crystalline granules;
   (f) said rubber crumbs and said crystalline granules forming an internal phase that is closely packed;
   (g) said binder forming an external phase;
   (h) said tire tread rubber, by weight thereof, consisting essentially of from 8 to 25% of an organic solvent residue, from 5 to 10% of an inorganic residue, form 25 to 45% of an inorganic filler, from a trace to 2% moisture, and from 35 to 50% of vulcanized rubber hydrocarbon;
   (i) said rubber crumbs and said siliceous granules generally having a mesh size ranging from 5 to 50;
   (j) said slab ranging from 3/16 to ⅜ inch in thickness.
   (k) in parts by total weight, said rubber crumbs ranging from 20 to 40, said silica granules ranging from 5 to 15, and said binder ranging from 10 to 30.

2. The product of claim 1 wherein there is a greater proportion of rubber crumbs than siliceous granules.

3. The product of claim 1 wherein said rubber crumbs and said crystalline silica granules are bonded both macro-mechanically and chemically to said binder.

4. The product of claim 1 wherein there is cross-linking between said polymerizate and the surfaces of said rubber crumbs.

* * * * *